US012769416B2

(12) United States Patent
Liu

(10) Patent No.: US 12,769,416 B2
(45) Date of Patent: Oct. 20, 2026

(54) TOUCH DISPLAY AND CONTROL METHOD THEREOF, AND TOUCH DISPLAY DEVICE AND CONTROL METHOD THEREOF

(71) Applicant: HUAWEI TECHNOLOGIES CO., LTD., Shenzhen (CN)

(72) Inventor: Weiping Liu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 19/206,578

(22) Filed: May 13, 2025

(65) Prior Publication Data

US 2025/0271968 A1 Aug. 28, 2025

Related U.S. Application Data

(63) Continuation of application No. PCT/CN2023/080580, filed on Mar. 9, 2023.

(30) Foreign Application Priority Data

Nov. 14, 2022 (WO) ................ PCT/CN2022/131785

(51) Int. Cl.
*G06F 3/0354* (2013.01)
*G06F 3/041* (2006.01)
*G06F 3/044* (2006.01)

(52) U.S. Cl.
CPC ...... *G06F 3/04162* (2019.05); *G06F 3/03545* (2013.01); *G06F 3/0412* (2013.01); *G06F 3/04166* (2019.05); *G06F 3/04184* (2019.05)

(58) Field of Classification Search
CPC .... G06F 3/03545; G06F 3/041; G06F 3/0412; G06F 3/04162; G06F 3/04166; G06F 3/04184; G06F 3/0443
See application file for complete search history.

(56) References Cited

U.S. PATENT DOCUMENTS

2015/0346902 A1 12/2015 Wyatt et al.
2018/0113559 A1* 4/2018 Bae ..................... G06F 3/03545
(Continued)

FOREIGN PATENT DOCUMENTS

CN 108874199 A 11/2018
CN 111427463 A 7/2020
CN 113377235 A 9/2021

OTHER PUBLICATIONS

International Search Report and Written Opinion in International Appln. No. PCT/CN2023/080580, mailed on Jun. 23, 2023, 17 pages (with English translation).
(Continued)

*Primary Examiner* — Julie Anne Watko
(74) *Attorney, Agent, or Firm* — Fish & Richardson P.C.

(57) ABSTRACT

Example touch displays and associated control methods are described, as well as touch display devices and related control methods. In one example, the control method of the display includes a touch display transmitting an uplink signal in a first long horizontal blanking phase, where the uplink signal is used to detect whether the active stylus performs an operation on the touch display The touch display receives a downlink signal from the active stylus in a second long horizontal blanking phase to an $m^{th}$ long horizontal blanking phase to perform active stylus detection. The control method may be used to control the touch display, to implement active stylus detection.

19 Claims, 11 Drawing Sheets

(56) References Cited

U.S. PATENT DOCUMENTS

| | | | | |
|---|---|---|---|---|
| 2020/0201505 | A1* | 6/2020 | Jung | G06F 3/0383 |
| 2021/0200404 | A1* | 7/2021 | Kim | G06F 3/04162 |
| 2022/0187941 | A1* | 6/2022 | Park | G06F 3/0383 |

OTHER PUBLICATIONS

Extended European Search Report in European Appln. No. 23890023.7, mailed on Jan. 20, 2026, 10 pages.

* cited by examiner

TOUCH DISPLAY AND CONTROL METHOD THEREOF, AND TOUCH DISPLAY DEVICE AND CONTROL METHOD THEREOF

CROSS-REFERENCE TO RELATED APPLICATION

This application is a continuation of International Application No. PCT/CN2023/080580, filed on Mar. 9, 2023, which claims priority to International Patent Application No. PCT/CN2022/131785, filed on Nov. 14, 2022. The disclosures of the aforementioned applications are hereby incorporated by reference in their entireties.

TECHNICAL FIELD

This application relates to the field of display technologies, and in particular, to a touch display and a control method thereof, and a touch display device and a control method thereof.

BACKGROUND

With development of liquid crystal display technologies, touch and display functions may be integrated together to form a touch display. An embedded touch display, also referred to as an in-cell touch display, has a touch electrode embedded in the display, and has become one of mainstream displays due to features such as lightness and thinness, high light transmittance, and low costs.

The touch electrode in the display operates based on a time sequence. In a display phase, the touch electrode is multiplexed as a common electrode, and receives a common voltage signal to perform displaying drive. In a touch phase, the touch electrode receives a drive signal to perform touch detection. The touch detection may include touching detection and active stylus detection.

An active stylus and the display have two independent systems. To ensure that the active stylus and the display can operate together, the active stylus needs to perform bidirectional interaction with the display according to a protocol. However, the protocol specifies a time sequence relationship between the active stylus and the display. This limits time sequence (the display phase and the touch phase) control of the display, and further affects performance of displaying, touching detection, and active stylus detection of the display.

SUMMARY

Embodiments of this application provide a touch display and a control method thereof, and a touch display device and a control method thereof, to reduce impact of an active stylus on the display, so as to improve performance of displaying, touching detection, and active stylus detection of the display.

To achieve the foregoing objectives, the following technical solutions are used in embodiments of this application.

According to a first aspect, a control method of a touch display is provided. Displaying of the touch display includes a plurality of frame periods, and each frame period includes a frame blanking interval and an effective operation interval. The effective operation interval includes a plurality of display refresh phases and a plurality of long horizontal blanking phases that are alternately arranged, and the plurality of long horizontal blanking phases include a first long horizontal blanking phase to an $m^{th}$ long horizontal blanking phase, where $m \geq 2$.

The control method includes: transmitting an uplink signal in the first long horizontal blanking phase. The uplink signal is used to detect whether an active stylus performs an operation on the touch display. A downlink signal from the active stylus is received in the second long horizontal blanking phase to the $m^{th}$ long horizontal blanking phase, to perform active stylus detection.

According to the control method provided in the foregoing embodiment of this application, the touch display transmits the uplink signal in the first long horizontal blanking phase. In a subsequent long horizontal blanking phase, the touch display receives the downlink signal from the active stylus, to perform active stylus detection.

A location of the long horizontal blanking phase changes in different frame periods. In this case, the touch display is controlled to transmit the uplink signal in the first long horizontal blanking phase and not transmit an uplink signal in the frame blanking interval. When the location of the long horizontal blanking phase changes, a time width of the frame blanking interval does not need to be increased to ensure that the uplink signal is transmitted in the frame blanking interval. This avoids compressing a time width of the effective operation interval, avoids compressing a time width of the display refresh phase and a time width of a touch detection phase, and helps improve performance of display refresh, touching detection, and active stylus detection of the touch display.

In some embodiments, the plurality of display refresh phases include row scanning time periods of a plurality of rows of subpixels of the touch display, and in at least two frame periods, two corresponding long horizontal blanking phases are respectively located between row scanning time periods of two different adjacent rows of subpixels.

It may be understood that, in the at least two frame periods, the two corresponding long horizontal blanking phases are respectively located between row scanning time periods of two different adjacent rows of subpixels. To be specific, the location of the long horizontal blanking phase in different frame periods is changed, so that a gate scanning signal of the touch display stays in different shift registers for approximately the same time. In this way, speeds of aging and driving force decrease of different shift registers are approximately the same, a phenomenon of displaying a "bright line" or a "dark line" by each row of subpixels can be improved, and quality of a display picture can be improved.

In some embodiments, in two adjacent frame periods, two corresponding long horizontal blanking phases are respectively located between row scanning time periods of two different adjacent rows of subpixels.

It may be understood that, a location of the long horizontal blanking phase in the two adjacent frame periods is changed, so that duration in which the gate scanning signal stays in a same shift register can be further shortened. This helps reduce speeds of aging and driving force decrease of the shift register, improve a phenomenon of displaying a "bright line" or a "dark line" by the row of subpixels, and improve quality of a display picture.

In some embodiments, in different frame periods, duration of intervals between the plurality of long horizontal blanking phases remains unchanged.

According to a protocol for the active stylus and the touch display, both duration of an interval between the uplink signal and the downlink signal and duration of an interval between two adjacent downlink signals have a fixed value. In different frame periods, locations of the plurality of long horizontal blanking phases are synchronously moved, so that the duration of the intervals between the plurality of long horizontal blanking phases remains unchanged, so as to ensure accuracy of active stylus detection.

In some embodiments, in the frame period, the plurality of long horizontal blanking phases include at least three long horizontal blanking phases, and any two adjacent long horizontal blanking phases have equal duration of interval, so that the plurality of long horizontal blanking phases are evenly distributed between row scanning time periods of the plurality of rows of subpixels.

In view of this, a location of the long horizontal blanking phase in different frame periods is changed, so that the gate scanning signals stay in shift registers at all levels for approximately the same time. In this way, speeds of aging and driving force decrease of the shift registers at all levels are approximately the same, a phenomenon of displaying a "bright line" or a "dark line" by each row of subpixels can be improved, and quality of a display picture can be improved.

In some embodiments, the second long horizontal blanking phase to the $m^{th}$ long horizontal blanking phase have equal duration, and duration of the first long horizontal blanking phase is not equal to duration of any one long horizontal blanking phase of the second long horizontal blanking phase to the $m^{th}$ long horizontal blanking phase. Alternatively, the first long horizontal blanking phase to the $m^{th}$ long horizontal blanking phase have equal duration.

In the foregoing embodiment, according to the protocol for the active stylus and the touch display, a time width of the uplink signal is a, and a time width of the downlink signal is c. The touch display transmits the uplink signal in the first long horizontal blanking phase, and performs active stylus detection based on the downlink signal in the second long horizontal blanking phase to the $m^{th}$ long horizontal blanking phase. Therefore, the duration of the first long horizontal blanking phase is a, and the second long horizontal blanking phase to the $m^{th}$ long horizontal blanking phase have equal duration and the duration is c.

When $a \neq c$, the duration of the first long horizontal blanking phase is not equal to the duration of any one long horizontal blanking phase of the second long horizontal blanking phase to the $m^{th}$ long horizontal blanking phase. When $a=c$, the first long horizontal blanking phase to the $m^{th}$ long horizontal blanking phase have equal duration.

In some embodiments, the duration of the uplink signal is equal to the duration of the first long horizontal blanking phase.

In some embodiments, the control method of the touch display further includes: performing, in the second long horizontal blanking phase to the $m^{th}$ long horizontal blanking phase, touching detection if the touch display does not receive the downlink signal.

It may be understood that, in the second long horizontal blanking phase to the $m^{th}$ long horizontal blanking phase, if the touch display does not receive the downlink signal, it indicates that the active stylus is not close to the touch display, and the active stylus does not perform an operation on the touch display. In view this, touching detection may be performed.

In some embodiments, the control method of the touch display further includes: performing touching detection in the frame blanking interval.

It may be understood that, in the frame blanking interval, the touch display does not perform display refresh, and a touch electrode may be used to perform touching detection, to detect a touch operation performed by a user on the touch display.

In some embodiments, the control method of the touch display further includes: performing displaying drive in the display refresh phase.

It may be understood that, in the display refresh phase, a plurality of touch electrodes are multiplexed as common electrodes, and the touch electrode and a pixel electrode of the touch display form an electric field, to drive liquid crystal molecules in a liquid crystal layer in the touch display to rotate, so as to implement displaying drive of the touch display.

According to a second aspect, a touch display is provided. Displaying of the touch display includes a plurality of frame periods, and each frame period includes a frame blanking interval and an effective operation interval. The effective operation interval includes a plurality of display refresh phases and a plurality of long horizontal blanking phases that are alternately arranged, and the plurality of long horizontal blanking phases include a first long horizontal blanking phase to an $m^{th}$ long horizontal blanking phase, where $m \geq 2$. The touch display is configured to transmit an uplink signal in the first long horizontal blanking phase, and receive a downlink signal from an active stylus in the second long horizontal blanking phase to the $m^{th}$ long horizontal blanking phase.

According to the touch display provided in the foregoing embodiment of this application, the touch display transmits the uplink signal in the first long horizontal blanking phase. In a subsequent long horizontal blanking phase, the touch display receives the downlink signal from the active stylus, to perform active stylus detection.

A location of the long horizontal blanking phase changes in different frame periods. In this case, the touch display is controlled to transmit the uplink signal in the first long horizontal blanking phase and not transmit an uplink signal in the frame blanking interval. When the location of the long horizontal blanking phase changes, a time width of the frame blanking interval does not need to be increased to ensure that the uplink signal is transmitted in the frame blanking interval. This avoids compressing a time width of the effective operation interval, avoids compressing a time width of the display refresh phase and a time width of a touch detection phase, and helps improve performance of display refresh, touching detection, and active stylus detection of the touch display.

In some embodiments, the touch display includes a time sequence controller, a touch drive circuit, and a plurality of touch electrodes disposed inside the touch display. The time sequence controller is electrically connected to the plurality of touch electrodes via the touch drive circuit.

The time sequence controller is configured to send a first control signal to the touch drive circuit in the first long horizontal blanking phase. The touch drive circuit is configured to drive, in response to the first control signal, the plurality of touch electrodes to transmit the uplink signal.

The time sequence controller is further configured to send a second control signal to the touch drive circuit in the second long horizontal blanking phase to the $m^{th}$ long horizontal blanking phase. The touch drive circuit is further configured to perform active stylus detection in response to the second control signal if the plurality of touch electrodes receive the downlink signal from the active stylus.

In the foregoing embodiment, the time sequence controller controls the touch drive circuit, and in the first long horizontal blanking phase, the touch drive circuit transmits a drive signal to the touch electrodes, to drive the plurality of touch electrodes to transmit the uplink signal.

In addition, in the second long horizontal blanking phase to the $m^{th}$ long horizontal blanking phase, when the active stylus is close to the touch electrode, the touch electrode senses the active stylus, to receive the downlink signal from the active stylus. The time sequence controller controls the touch drive circuit, and the touch drive circuit may perform active stylus detection based on the downlink signal on the touch electrode.

In some embodiments, the time sequence controller is further configured to send a third control signal to the touch drive circuit in the second long horizontal blanking phase to the $m^{th}$ long horizontal blanking phase. The touch drive circuit is further configured to drive, in response to the third control signal if the plurality of touch electrodes do not receive the downlink signal from the active stylus, the plurality of touch electrodes to perform touching detection.

In the foregoing embodiment, in the second long horizontal blanking phase to the $m^{th}$ long horizontal blanking phase, if the plurality of touch electrodes do not receive a downlink signal, it indicates that the active stylus is not close to the touch display, and the active stylus does not perform an operation on the touch display.

In view of this, when a user touches the touch display, the touch electrode generates a sensing signal. The time sequence controller controls the touch drive circuit, and the touch drive circuit may perform touching detection based on the sensing signal.

In some embodiments, the time sequence controller is further configured to send a fourth control signal to the touch drive circuit in the frame blanking interval. The touch drive circuit is further configured to drive, in response to the fourth control signal, the plurality of touch electrodes to perform touching detection.

In the foregoing embodiment, in the frame blanking interval, the touch display does not perform display refresh. In view of this, when the user touches the touch display, the touch electrode generates a sensing signal. The time sequence controller controls the touch drive circuit, and the touch drive circuit may perform touching detection based on the sensing signal.

In some embodiments, the time sequence controller is further configured to send a fifth control signal to the touch drive circuit in the display refresh phase. The touch drive circuit is further configured to drive, in response to the fifth control signal, the plurality of touch electrodes to perform displaying drive.

In the foregoing embodiment, in the display refresh phase, the plurality of touch electrodes are multiplexed as common electrodes, and the time sequence controller controls the touch drive circuit, to transmit a common voltage signal to the plurality of touch electrodes. In addition, a pixel electrode receives a pixel voltage signal from a pixel driving circuit, and the pixel electrode and the touch electrode form an electric field, to drive liquid crystal molecules in the liquid crystal layer to rotate, so as to implement displaying drive of the touch display.

According to a third aspect, a touch display device is provided. The touch display device includes an active stylus and the touch display in any one of the foregoing embodiments, and the touch display is configured to transmit an uplink signal in a first long horizontal blanking phase. The active stylus is configured to transmit at least one downlink signal in response to the uplink signal. The touch display is further configured to receive the at least one downlink signal in at least one long horizontal blanking phase of the second long horizontal blanking phase to the $m^{th}$ long horizontal blanking phase, to detect the active stylus.

According to the touch display device provided in the foregoing embodiment of this application, the touch display may transmit the uplink signal in the first long horizontal blanking phase. According to a protocol for the active stylus and the touch display, the active stylus transmits at least one downlink signal in response to the uplink signal in at least one long horizontal blanking phase of the second long horizontal blanking phase to the $m^{th}$ long horizontal blanking phase. The touch display may receive the downlink signal in a corresponding long horizontal blanking phase, to detect the active stylus.

A location of the long horizontal blanking phase changes in different frame periods. In this case, the touch display transmits the uplink signal in the first long horizontal blanking phase, and does not transmit an uplink signal in a frame blanking interval. A time width of the frame blanking interval does not need to be increased when a location of the uplink signal changes. This avoids compressing a time width of an effective operation interval, avoids compressing a time width of a display refresh phase and a time width of a touch detection phase, and helps improve performance of display refresh, touching detection, and active stylus detection of the touch display.

According to a fourth aspect, a control method of a touch display device is provided. The touch display device includes an active stylus and the touch display in any one of the foregoing embodiments. The control method includes: A touch display transmits an uplink signal in a first long horizontal blanking phase, and an active stylus receives the uplink signal. In at least one long horizontal blanking phase of a second long horizontal blanking phase to an $m^{th}$ long horizontal blanking phase, the active stylus transmits a downlink signal in response to the uplink signal, and the touch display receives the downlink signal to detect the active stylus.

According to the control method provided in the foregoing embodiment of this application, the touch display transmits the uplink signal in the first long horizontal blanking phase, and the active stylus receives the uplink signal. According to a protocol for the active stylus and the touch display, in at least one subsequent long horizontal blanking phase, the active stylus transmits the downlink signal in response to the uplink signal, and the touch display receives the downlink signal, so as to detect the active stylus.

A location of the long horizontal blanking phase changes in different frame periods. In this case, the touch display transmits the uplink signal in the first long horizontal blanking phase, and does not transmit an uplink signal in a frame blanking interval. A time width of the frame blanking interval does not need to be increased when a location of the uplink signal changes. This avoids compressing a time width of an effective operation interval, avoids compressing a time width of a display refresh phase and a time width of a touch detection phase, and helps improve performance of display refresh, touching detection, and active stylus detection of the touch display.

BRIEF DESCRIPTION OF DRAWINGS

To describe technical solutions in this disclosure more clearly, the following briefly describes accompanying drawings used in describing some embodiments of this disclosure. Apparently, the accompanying drawings in the following description are merely accompanying drawings in some embodiments of this disclosure. For a person of ordinary skill in the art, other drawings may also be derived from these drawings. In addition, the accompanying drawings in the following description may be considered as diagrams, and are not intended to limit an actual size of a product, an actual procedure of a method, an actual time sequence of a signal, and the like in embodiments of this disclosure.

DESCRIPTION OF EMBODIMENTS

Figure 1:
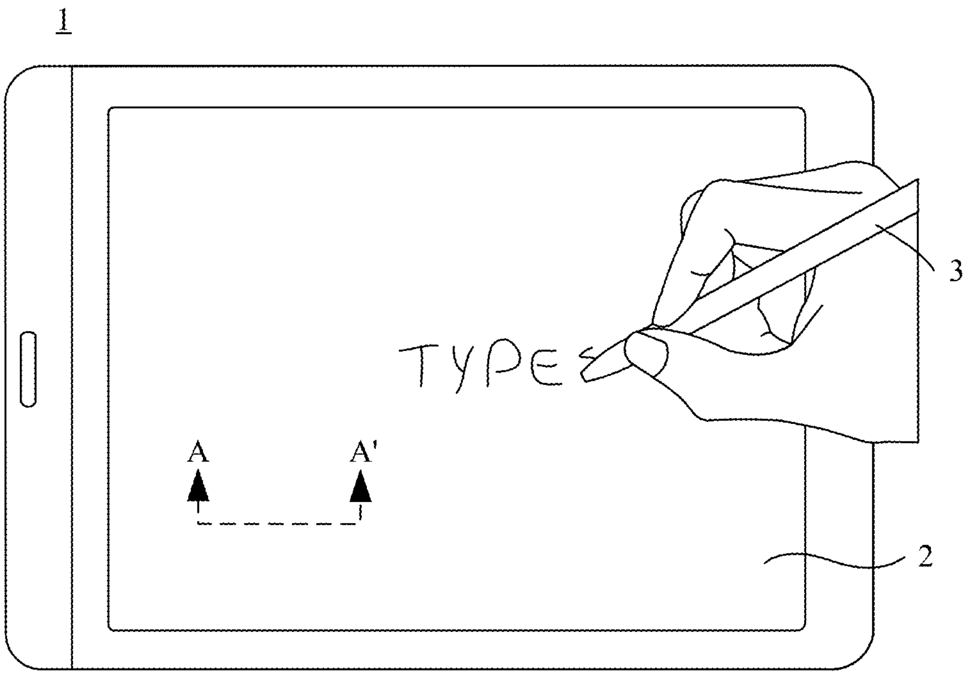
FIG. 1 is a diagram of a structure of a touch display device according to some embodiments.

The following clearly and completely describes technical solutions in some embodiments of this disclosure with reference to accompanying drawings. Apparently, the described embodiments are merely some rather than all of embodiments of this disclosure. All other embodiments obtained by a person of ordinary skill in the art based on embodiments provided in this disclosure shall fall within the protection scope of this disclosure.

In the descriptions of this disclosure, it should be understood that, position or location relationships indicated by the terms "center", "upper", "lower", "ahead", "behind", "left", "right", "perpendicular", "horizontal", "top", "bottom", "inner", "outer", and the like are position or location relationships based on the accompanying drawings, and are merely intended for ease of describing this disclosure and simplification of description, instead of indicating or implying that the apparatuses or components referred to need to be provided in a particular position or be constructed and operated in a particular position, and therefore, shall not be understood as limitations on this disclosure.

Unless otherwise required by the context, throughout the specification and claims, the term "include" is interpreted as "open and inclusive", that is, "include but not limited to". In the descriptions of the specification, terms such as "an embodiment", "some embodiments", "example embodiments", "examples", or "some examples" are intended to indicate that specific features, structures, materials, or features related to embodiments or examples are included in at least one embodiment or example of the present disclosure. The foregoing schematic representations of the terms do not necessarily refer to a same embodiment or example. Further, the particular feature, structure, material, or characteristic may be included in any one or more embodiments or examples in any appropriate manner.

Terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of embodiments of this disclosure, unless otherwise specified, "a plurality of" means two or more.

In the description of some embodiments, expressions of "connection" and extensions thereof may be used. For example, when some embodiments are described, the term "connection" may be used to indicate that two or more components are in direct physical contact or electrical contact with each other. Embodiments disclosed herein are not necessarily limited to content of this specification.

"At least one of A, B, and C" and "at least one of A, B, or C" have the same meaning, and both include the following combinations of A, B, and C: only A, only B, only C, a combination of A and B, a combination of A and C, a combination of B and C, and a combination of A, B, and C.

"A and/or B" includes the following three combinations: only A, only B, and a combination of A and B.

The use of "configured to" in this specification implies an open and inclusive language, and does not exclude a device that is applicable to or configured to perform an additional task or step.

In addition, the use of "based on" means openness and inclusiveness, since processes, steps, calculation, or other actions "based on" one or more of conditions or values may be based in practice on additional conditions or values outside the described values.

As used herein, "about" or "approximately" includes the stated values and the average values within an acceptable deviation range of a particular value, where the acceptable deviation range is determined by a person of ordinary skill in the art by considering an error (namely, a limitation of a measurement system) related to measurement being discussed and measurement of a specific quantity.

Example implementations are described herein with reference to a sectional view and/or a plane view of the accompanying drawings as idealized example drawings. In the accompanying drawings, for clarity, thicknesses of layers and regions are increased. Thus, a change in a shape in the accompanying drawings due to, for example, manufacturing techniques and/or tolerances may be envisaged. Therefore, example implementations should not be construed as being limited to a shape of a region shown herein, but rather include shape deviations due to, for example, manufacturing. For example, an etching region shown as a rectangle typically has a bending characteristic. Therefore, the regions shown in the accompanying drawings are essentially examples, and their shapes are not intended to show actual shapes of regions of a device, and are not intended to limit a scope of the example implementations.

Figure 2:
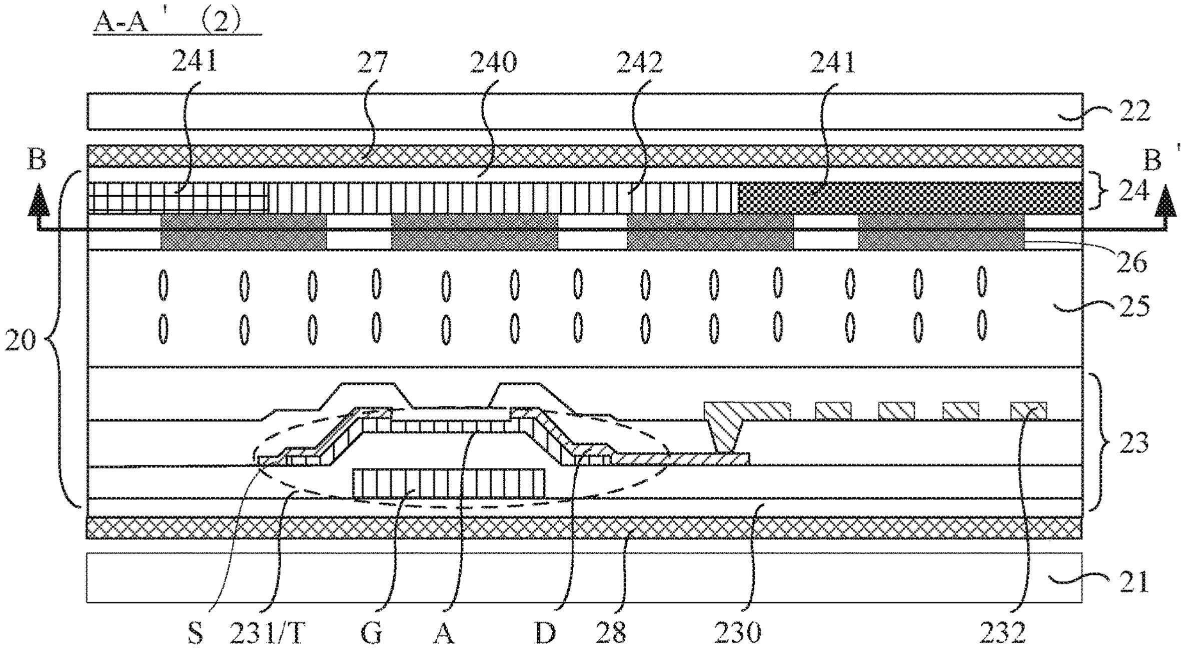
FIG. 2 is a sectional view of the touch display in FIG. 1 along a section line A-A'.
Figure 3:
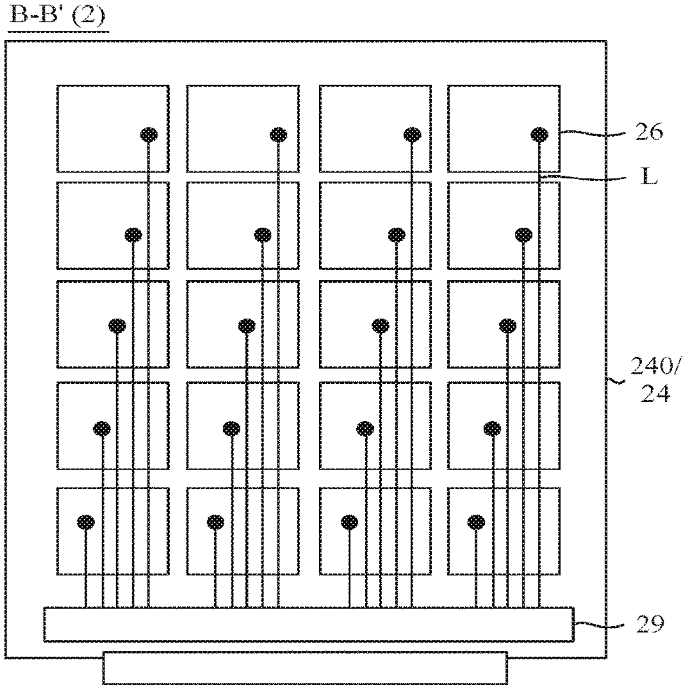
FIG. 3 is a sectional view of the touch display in FIG. 2 along a section line B-B'.

Some embodiments of this application provide a touch display device. FIG. 1 is a diagram of a structure of the touch display device according to some embodiments. FIG. 2 is a sectional view of the touch display in FIG. 1 along a section line A-A'. FIG. 3 is a sectional view of the touch display in FIG. 2 along a section line B-B'.

Refer to FIG. 1. A touch display device 1 includes a touch display 2 and an active stylus 3.

The touch display device 1 may be a mobile terminal device like a mobile phone or a tablet computer.

For example, as shown in FIG. 2, the touch display 2 may be a liquid crystal display (Liquid Crystal Display, LCD for short). The touch display 2 includes a liquid crystal display panel 20, a backlight module 21, and cover glass 22. The backlight module 21 is configured to provide a light source for the liquid crystal display panel 20. The liquid crystal display panel 20 includes an array substrate 23, an aligned substrate 24, a liquid crystal layer 25 disposed between the array substrate 23 and the aligned substrate 24, and a touch electrode 26 disposed between the aligned substrate 24 and the liquid crystal layer 25.

The array substrate 23 includes a plurality of subpixels arranged in an array manner. The plurality of subpixels include a plurality of rows and a plurality of columns. Each row of subpixels is electrically connected to a gate driving circuit through a gate line. The gate driving circuit transmits a gate scanning signal to each row of subpixels through the gate line. Each row of subpixels may be enabled under control of the gate scanning signal, to perform row scanning. Each column of subpixels is electrically connected to a data line, and the data line may transmit a display data signal to a corresponding column of subpixels.

Refer to FIG. 2. Each subpixel includes a pixel driving circuit 231 disposed on a first substrate 230 of the array substrate 23, and a pixel electrode 232 electrically connected to the pixel driving circuit 231. The pixel driving circuit 231 includes a thin film transistor T (Thin Film Transistor, TFT for short). The thin film transistor T includes an active layer A, a source S, a drain D, and a gate G. The source S and the drain D are separately in contact with the active layer A, and the pixel electrode 232 is electrically connected to the drain D of the thin film transistor T. The pixel electrode 232 is of a comb structure including a plurality of strip sub-electrodes.

Refer to FIG. 2. The aligned substrate 24 includes a color filter layer 241 disposed on a second substrate 240. In this case, the aligned substrate 24 may also be referred to as a color film substrate (Color Filter, CF for short). The color filter layer 241 includes at least a red photoresist unit, a green photoresist unit, and a blue photoresist unit. The red photoresist unit, the green photoresist unit, and the blue photoresist unit are respectively aligned with the subpixels on the array substrate 23. The aligned substrate 24 further includes a black matrix pattern 242 disposed on the second substrate 240, and the black matrix pattern 242 is used to separate the red photoresist element, the green photoresist element, and the blue photoresist element.

Refer to FIG. 2. The touch display 2 may further include a first optical membrane 27 disposed between the liquid crystal display panel 20 and the cover glass 22, and a second optical membrane 28 disposed between the liquid crystal display panel 20 and the backlight module 21.

The touch electrode 26 is embedded in the touch display 2. Therefore, the touch display 2 may be referred to as an embedded touch display, or also referred to as an in-cell touch display. The embedded touch display has become one of mainstream liquid crystal displays due to features such as lightness and thinness, high light transmittance, and low costs.

Refer to FIG. 2. The touch electrode 26 operates based on a time sequence. In a display refresh phase, the touch electrode 26 is multiplexed as a common electrode, and row scanning is performed on each row of subpixels. The pixel electrode 232 receives a pixel voltage signal from the pixel driving circuit 231, and the touch electrode 26 receives a common voltage signal. The pixel electrode 232 and the touch electrode 26 form an electric field, to drive liquid crystal molecules in the liquid crystal layer 25 to rotate, so as to adjust a light emission rate of the touch display 2.

Refer to FIG. 3. The touch electrode 26 may be disposed on the aligned substrate 24. The touch display 2 further includes a touch wire L and a touch drive circuit 29. Both the touch wire L and the touch drive circuit 29 may be disposed on the second substrate 240 of the aligned substrate 24. The touch electrode 26 may be electrically connected to the touch drive circuit 29 through the touch wire L.

In a touch detection phase, the touch electrode 26 receives a drive signal from the touch drive circuit 29. When a user touches the touch display 2 or uses the active stylus 3, the touch electrode 26 generates a sensing signal, and the touch drive circuit 29 may perform touch detection (touching detection or active stylus detection) based on the sensing signal.

Figure 4:
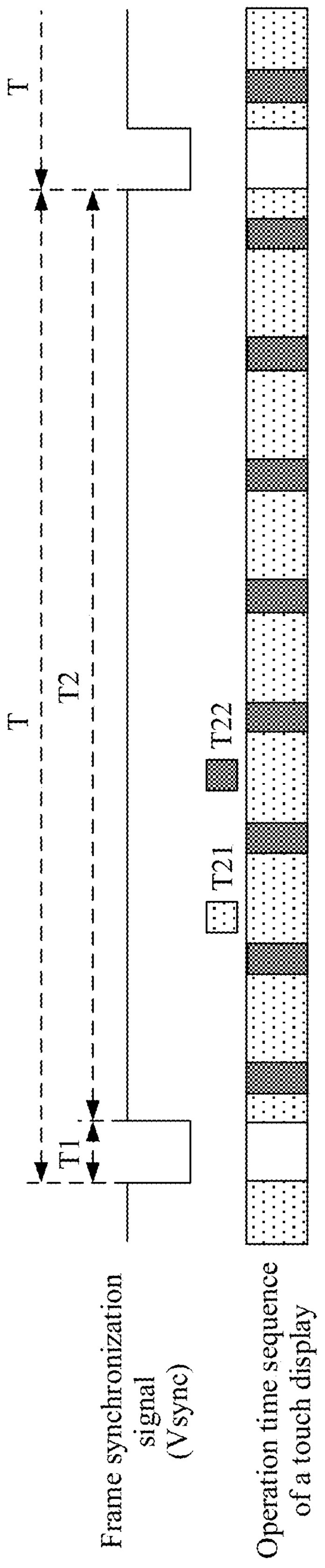
FIG. 4 is a control time-sequence diagram of a touch display according to some embodiments.

FIG. 4 is a control time-sequence diagram of a touch display according to some embodiments.

Refer to FIG. 4. A control signal of the touch display 2 includes a frame synchronization signal (Vsync), the frame synchronization signal includes a plurality of frame periods T, and the touch display 2 displays a picture in each frame period T. Each frame period T includes a frame blanking interval (Vblank) T1 and an effective operation interval T2, and each effective operation interval T2 includes a plurality of display refresh phases T21 and a plurality of touch detection phases T22 that are alternately arranged.

It may be understood that, in the frame blanking interval T1, the touch display 2 does not perform display refresh, row scanning is disabled for each row of subpixels under control of the gate line, and the display data signal is not updated on the data line connected to each column of subpixels.

Therefore, in the frame blanking interval T1, the touch electrode 26 is not configured to perform display refresh, and the touch electrode 26 may be used to perform touch detection. That is, the touch display 2 may perform touch detection in the frame blanking interval T1.

Because the "effective operation interval T2" includes the display refresh phase T21 and the touch detection phase T22, the "effective operation interval T2" refers to a time period in which the touch display 2 performs display refresh and touch detection.

For example, as shown in FIG. 4, the frame synchronization signal (Vsync) is at a low level in the frame blanking interval T1, and is at a high level in the effective operation interval T2.

Usually, a touch detection frequency (also referred to as a report rate) of the touch display 2 is set based on user experience, and is greater than a display refresh frequency. In the embedded touch display, the touch electrode 26 operates based on a time sequence, in other words, touch detection and display refresh are performed based on the time sequence. To ensure that time sequences of touch detection and display refresh cooperate with each other, the touch detection frequency may be set to an integer multiple of the display refresh frequency.

For example, the touch detection frequency may be equal to the display refresh frequency, that is, in each frame period T, a quantity of frames for touch detection is the same as a quantity of frames for display refresh. For example, the display refresh frequency is 60 Hz, 90 Hz, or 120 Hz, and correspondingly, the touch detection frequency is 60 Hz, 90 Hz, or 120 Hz.

For example, the touch detection frequency may be twice the display refresh frequency, in other words, in each frame period T, a quantity of frames for touch detection is twice a quantity of frames for display refresh. For example, the display refresh frequency is 60 Hz, 90 Hz, or 120 Hz, and correspondingly, the touch detection frequency is 120 Hz, 180 Hz, or 240 Hz.

Still refer to FIG. 4. When the display refresh frequency is 60 Hz and the touch detection frequency is 120 Hz, each frame period T includes one frame of display refresh and two frames of touch detection. In addition, one frame of touch detection needs to be completed in four touch detection phases T22. Therefore, eight touch detection phases T22 need to be inserted into one frame of display refresh. For example, intervals of the eight touch detection phases T22 are equal, and are evenly distributed in the effective operation interval T2.

Figure 5:
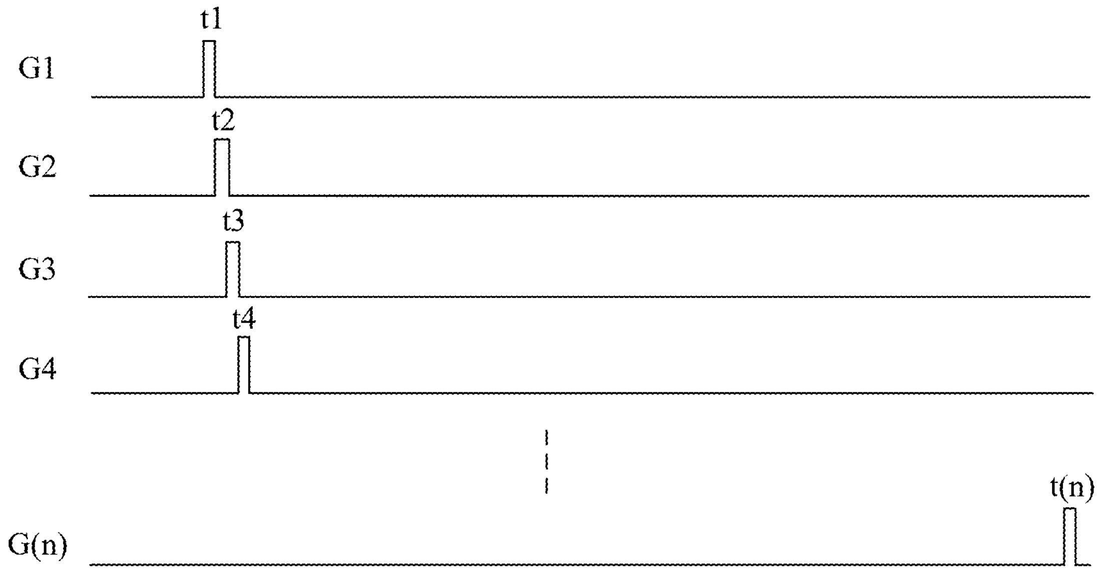
FIG. 5 is a diagram of a waveform of a row scanning signal of each row of subpixels of a touch display according to some embodiments.

FIG. 5 is a diagram of a waveform of a row scanning signal of each row of subpixels of a touch display according to some embodiments.

Refer to FIG. 5. The plurality of display refresh phases T21 include row scanning time periods (t1, t2, . . . , t(n)) of a plurality of rows of subpixels, where n≥2.

It may be understood that, the plurality of rows of subpixels include subpixels in a first row to an $n^{th}$ row, and the subpixels in the first row to the $n^{th}$ row are in a one-to-one correspondence with and connected to n gate lines (G1, G2, . . . , G(n)). The n gate lines (G1, G2, . . . , G(n)) respectively transmit row scanning signals, and transmission of the row scanning signals are sequentially performed in row scanning time periods (t1, t2, . . . , t(n)), so that the subpixels in the first row to the $n^{th}$ row are scanned row by row.

In the following embodiments, that resolution of the touch display 2 is 1200×1920 is used as an example. The plurality of subpixels arranged in an array manner include subpixels of 1200 columns×1920 rows. In each frame period T, 1920 rows of subpixels are scanned row by row, to transmit 1200 display data signals to 1200 columns of subpixels.

A time interval between row scanning time periods of two adjacent rows of subpixels is referred to as a "horizontal blanking phase" (Hblank). Usually, time of the horizontal blanking phase is short, and a time unit of the horizontal blanking phase is a microsecond.

Figure 6:
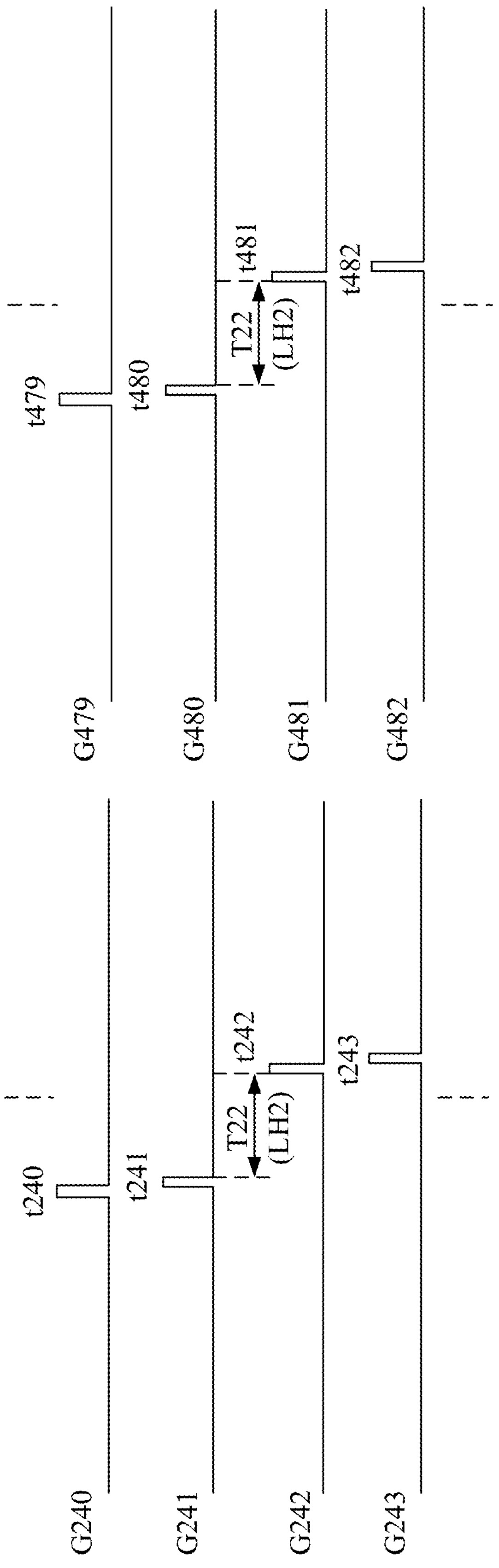
FIG. 6 is a diagram of a time sequence relationship between a touch detection phase and a row scanning time period according to some embodiments.

FIG. 6 is a diagram of a time sequence relationship between a touch detection phase and a row scanning time period according to some embodiments.

Refer to FIG. 6. The touch detection phase T22 is inserted between row scanning time periods of two adjacent rows of subpixels, that is, the touch detection phase T22 falls within the horizontal blanking phase. In addition, because time of the touch detection phase T22 is set to be long, the touch detection phase T22 is also referred to as a "long horizontal blanking phase LH (Long Hblank)".

For example, when eight touch detection phases T22 are inserted into one frame of display refresh, the eight touch detection phases T22 are sequentially named LH1 to LH8, and LH1 to LH8 are evenly distributed between row scanning time periods (t1 to t1920) of subpixels in the first row to the $1920^{th}$ row.

For example, LH1 to LH8 may be respectively located between t1 and t2, between t241 and t242, between t481 and t482, between t721 and t722, between t961 and t962, between t1201 and t1202, between t1441 and t1442, and between t1681 and t1682.

For another example, LH1 to LH8 may be respectively located between t240 and t241, between t480 and t481, between t720 and t721, between t960 and t961, between t1200 and t1201, between t1440 and t1441, between t1680 and t1681, and between t1920 and t1921.

FIG. 6 shows a case in which LH2 is located between t241 and t242, or between t480 and t481. For another example, LH2 may be located between t(a) and t(a+1), where 241<a<480.

The gate driving circuit includes a plurality of levels of shift registers, and the plurality of levels of shift registers are in a one-to-one correspondence with and connected to a plurality of gate lines. Each level of shift register outputs a gate scanning signal to a corresponding gate line, and transmits the gate scanning signal to a next level of shift register as an input signal.

Through research, the inventor of this application finds that insertion of the long horizontal blanking phase LH delays transmission of a gate scanning signal by the shift register to a next level of shift register, so that the gate scanning signal stays in the shift register for a long time. As a result, speeds of aging and driving force decrease of the shift register increase. Consequently, a corresponding row of subpixels displays a "bright line" or a "dark line", and quality of a display picture is reduced.

In addition, when the touch display 2 is a low temperature poly-silicon (Low Temperature Poly-Silicon, LTPS for short) display, a phenomenon of driving force decrease of the shift register is light. When the touch display 2 is an amorphous silicon (a-Si) display, a phenomenon of driving force decrease of the shift register is serious.

Figure 7:
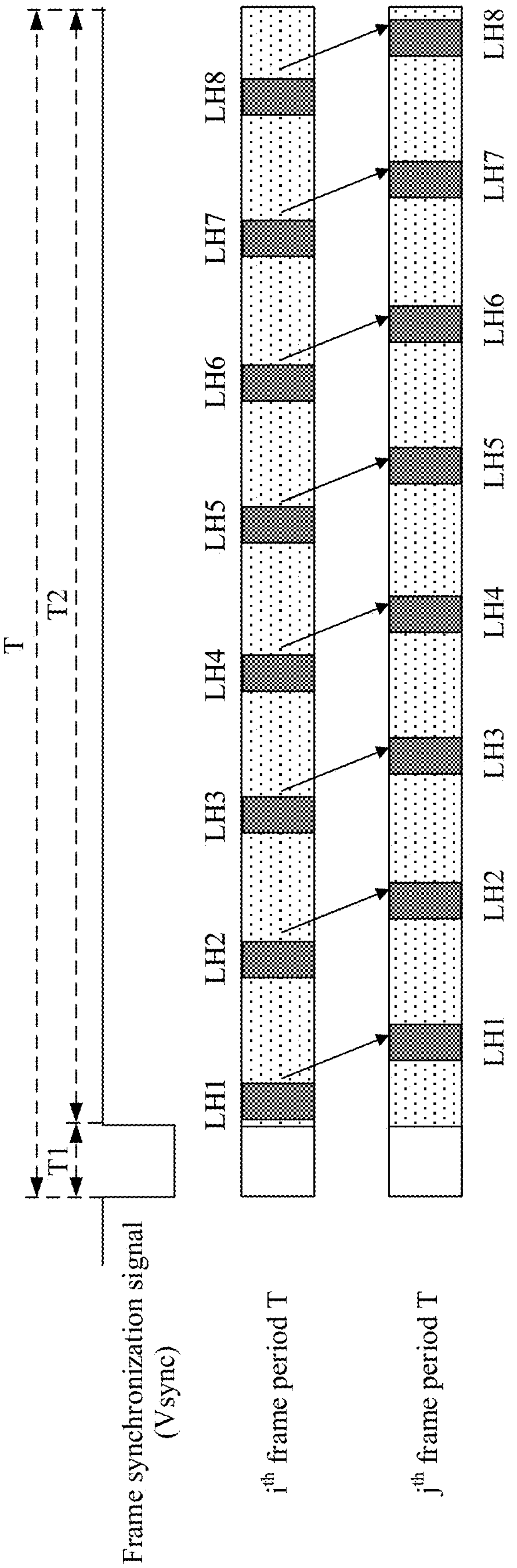
FIG. 7 is a diagram of a control method of a touch display according to some embodiments.

To resolve the foregoing problem, some embodiments of this application provide a control method of a touch display. FIG. 7 is a diagram of a control method of a touch display according to some embodiments.

Refer to FIG. 7. A location of each long horizontal blanking phase LH in different frame periods T may be changed. For example, in an $i^{th}$ frame period and a $j^{th}$ frame period (i≠j), locations of LH1 to LH8 all change.

For example, in the $i^{th}$ frame period and the $j^{th}$ frame period, LH1 moves between t1 and t241, LH2 moves between t241 and t481, LH3 moves between t481 and t721, LH4 moves between t721 and t961, LH5 moves between t961 and t1201, LH6 moves between t1201 and t1441, LH7 moves between t1441 and t1681, and LH8 moves between t1681 and t1921, so that two corresponding long horizontal blanking phases LHs are respectively located between row scanning time periods of two different adjacent rows of subpixels.

"Two corresponding long horizontal blanking phases LHs" are two long horizontal blanking phases LHs that are in a same order in two different frame periods. For example, LH1 in the $i^{th}$ frame period corresponds to LH1 in the $j^{th}$ frame period, LH2 in the $i^{th}$ frame period corresponds to LH2 in the $j^{th}$ frame period, . . . , and LH8 in the $i^{th}$ frame period corresponds to LH8 in the $j^{th}$ frame period.

According to the control method, the location of each long horizontal blanking phase LH in different frame periods T is changed, so that a gate scanning signal stays in different shift registers for approximately the same time. In this way, speeds of aging and driving force decrease of different shift registers are approximately the same, a phenomenon of displaying a "bright line" or a "dark line" by each row of subpixels can be improved, and quality of a display picture can be improved.

Currently, application of an active stylus 3 in a touch display device 1 has gradually become popular, and the active stylus 3 has features such as good performance and low costs. Specifically, the active stylus 3 may actively transmit a signal so that a stylus tip is detected by a touch display 2, and detection precision is high. The active stylus 3 also supports functions such as hover recognition, stylus tilt angle detection, and pressure detection, to better restore handwriting. In addition, a plurality of control buttons are further disposed on the active stylus 3, which respectively correspond to functions such as eraser and highlight.

The active stylus 3 and the touch display 2 have two independent systems. To ensure that the active stylus 3 and the touch display 2 can operate together, the active stylus 3 needs to perform bidirectional interaction with the touch display 2 according to a protocol. The touch display 2 may transmit an uplink (uplink) signal, and the active stylus 3 may receive the uplink signal; and the active stylus 3 may transmit a downlink (downlink) signal, and the touch display 2 may receive the downlink signal, so as to more flexibly control the touch display 2 and the active stylus 3.

Figure 8:
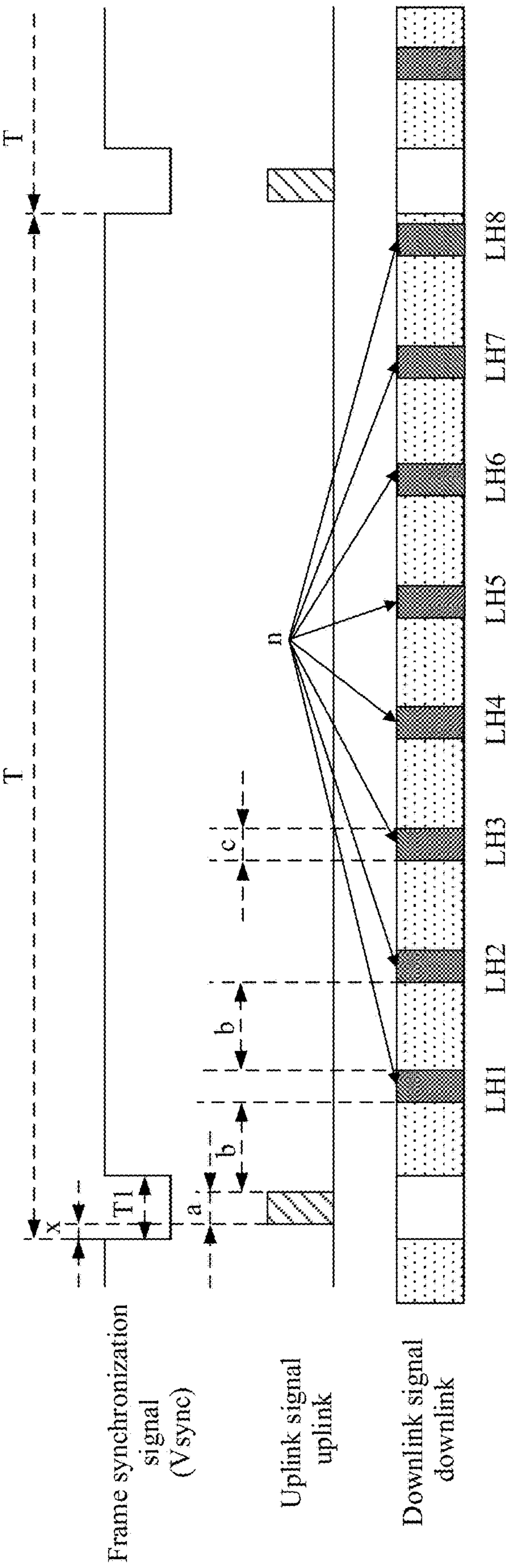
FIG. 8 is a diagram of a time sequence relationship between an uplink signal and a downlink signal in a related technology.

FIG. 8 is a diagram of a time sequence relationship between an uplink signal and a downlink signal in a related technology.

Refer to FIG. 8. According to the protocol for the active stylus 3 and the touch display 2, a frequency at which the touch display 2 transmits the uplink signal is the same as a display refresh frequency, and the touch display 2 transmits the uplink signal in a frame blanking interval T1, where a time width of the uplink signal is a. After receiving the uplink signal, the active stylus 3 transmits one downlink signal in each long horizontal blanking phase LH, and transmits n downlink signals in total. In addition, both duration of an interval between the uplink signal and a first downlink signal and duration of an interval between two adjacent downlink signals are b, where a time width of the downlink signal is c.

It may be understood that the touch display 2 does not perform display refresh in the frame blanking interval T1, a touch electrode 26 is not configured to perform display refresh, and the touch electrode 26 may be used to transmit the uplink signal.

In the long horizontal blanking phase LH, the touch electrode 26 may be used for touching detection or active stylus detection. Therefore, the active stylus 3 may transmit the downlink signal in the long horizontal blanking phase LH, and the touch electrode 26 may be used to receive the downlink signal.

Usually, the time width a of the uplink signal has a fixed design value, and the duration b of the interval, the time width c of the downlink signal, and the quantity n of times have designed range values. The duration b of the interval, the time width c of the downlink signal, and the quantity n of times may be set based on a time sequence relationship between the frame blanking interval T1 and the long horizontal blanking phase LH. However, these parameters cannot be frequently changed once being set, and are changed only in a case in which there is major scenario switching (for example, switching of a display refresh frequency), to avoid that a process of changing the parameters affects active stylus 3 detection.

Still refer to FIG. 8. Duration of an interval between a moment at which the touch display 2 starts to transmit the uplink signal and a moment at which the frame blanking interval T1 starts is X, and X also has a fixed design value, so that a location of the uplink signal is fixed relative to a location of the frame blanking interval T1. According to the protocol for the active stylus 3 and the touch display 2, a location of the downlink signal is also fixed.

However, the active stylus 3 transmits the downlink signal in the long horizontal blanking phase LH, and the fixed location of the downlink signal means that a location of the long horizontal blanking phase LH also needs to be fixed. Consequently, speeds of aging and driving force decrease of the shift register increase. Consequently, a corresponding row of subpixels displays a "bright line" or a "dark line", and quality of a display picture is reduced.

Figure 9:
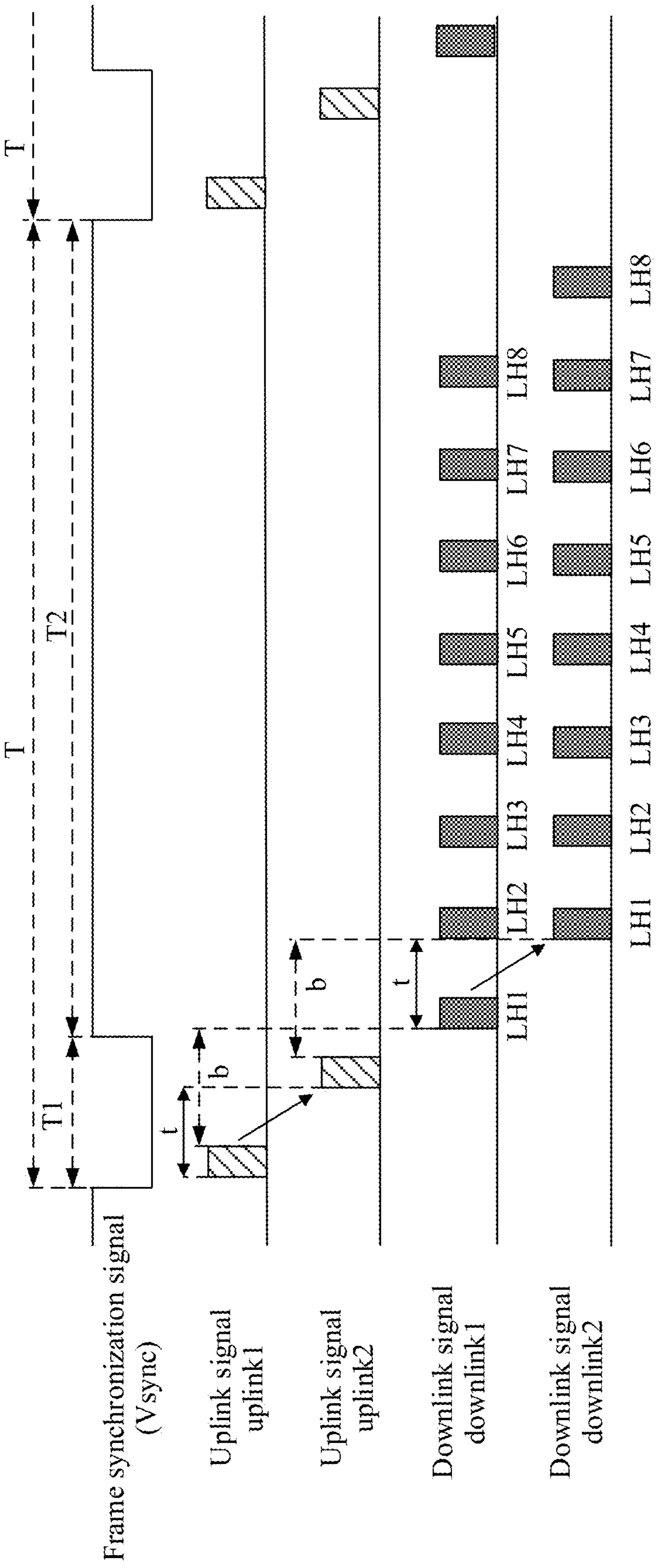
FIG. 9 is a diagram of a control method of a touch display in a related technology.

In view of this, a related technology provides a control method of a touch display. FIG. 9 is a diagram of the control method of a touch display in the related technology.

Refer to FIG. 9. A location of each long horizontal blanking phase LH in different frame periods T is changed to adjust a location of a downlink signal. For example, a location of a downlink1 signal is different from a location of a downlink2 signal, so that a gate scanning signal stays in different shift registers for approximately the same time, and speeds of aging and driving force decrease of different shift registers are approximately the same.

According to a protocol for an active stylus 3 and a touch display 2, when the location of the downlink signal is adjusted, a location of an uplink signal also needs to be synchronously adjusted. For example, a location of an uplink1 signal is different from a location of an uplink2 signal, so as to ensure that duration b of an interval between the uplink signal and the first downlink signal remains unchanged.

Still refer to FIG. 9. A time width of a frame blanking interval T1 is increased, to ensure that the location of the uplink signal is still located in the frame blanking interval T1 after adjustment, so that a time of transmitting the uplink signal by the touch display 2 may not overlap with a display refresh phase, to avoid impact on display refresh of the touch display 2.

For example, the time width increased for the frame blanking interval T1 is a time width adjusted for each LH.

For example, LH1 to LH8 are evenly distributed. In two adjacent LHs, duration t of an interval between a moment at which a previous LH starts and a moment at which a next LH starts is approximately 1.8 ms, a time width adjusted by each LH may be 1.8 ms, and a time width increased for the frame blanking interval T1 may be 1.8 ms.

However, when duration of the frame period T remains unchanged, increasing the time width of the frame blanking interval T1 compresses a time width of an effective operation interval T2, and compresses a time width of a display refresh phase T21 and a time width of a touch detection phase T22. Consequently, performance of display refresh, touching detection, and active stylus 3 detection of the touch display 2 is affected. When a display refresh frequency of the touch display 2 is high, the foregoing problem is particularly obvious.

Figure 10:
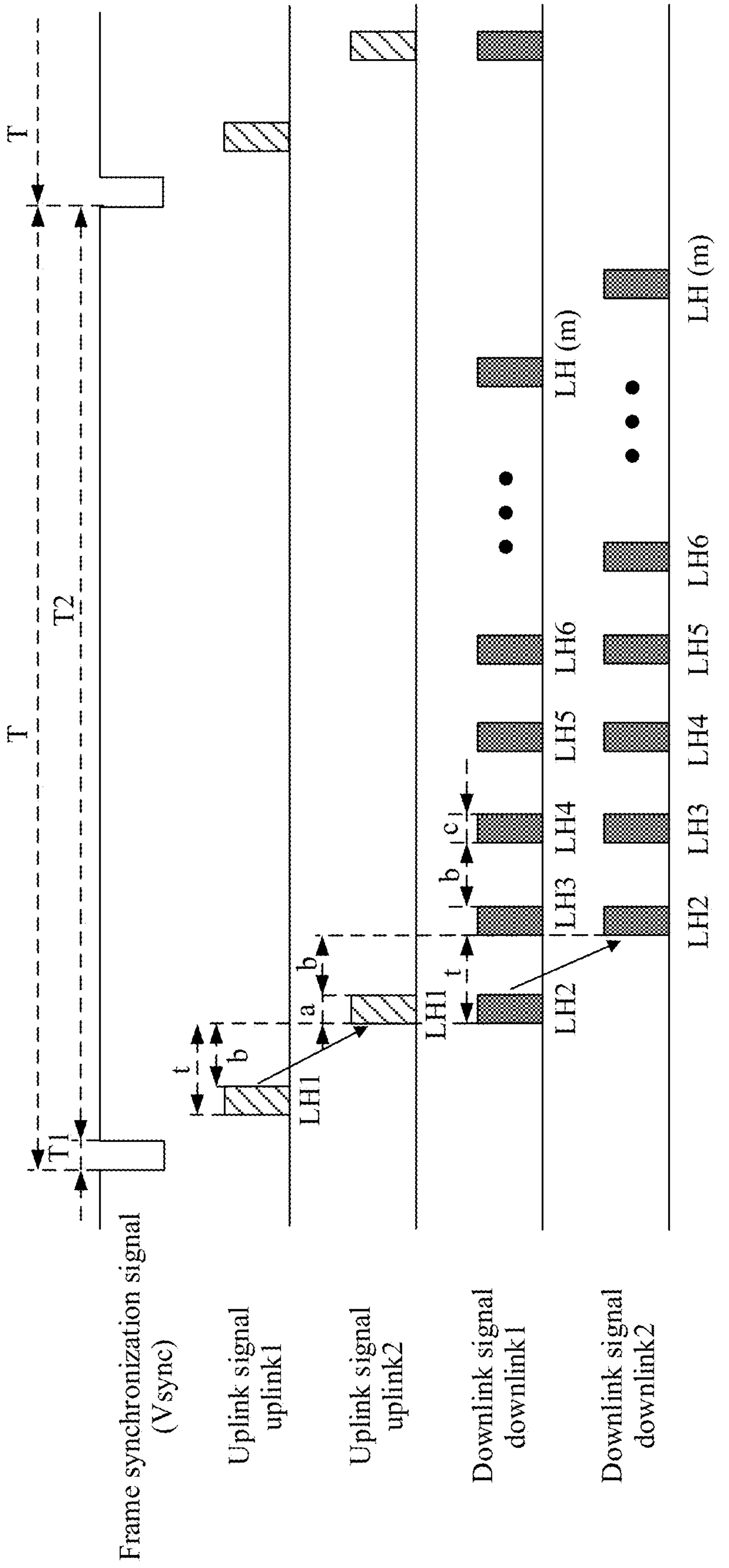
FIG. 10 is a diagram of a control method of a touch display according to some embodiments.
Figure 11:
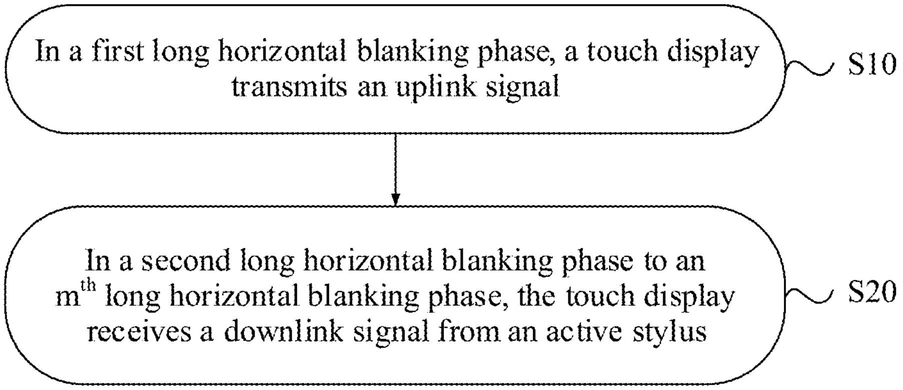
FIG. 11 is a flowchart of a control method of a touch display according to some embodiments.

To resolve the foregoing problem, some embodiments of this application further provide a control method of a touch display. FIG. 10 is a diagram of a control method of a touch display according to some embodiments. FIG. 11 is a flowchart of a control method of a touch display according to some embodiments.

Refer to FIG. 10. A plurality of long horizontal blanking phases LHs include a first long horizontal blanking phase LH1 to an $m^{th}$ long horizontal blanking phase LH(m), where $m \geq 2$. A location of the long horizontal blanking phase LH changes in different frame periods T.

Refer to FIG. 11. The control method of the touch display 2 includes the following S10 and S20.

S10: In the first long horizontal blanking phase LH1, the touch display 2 transmits an uplink (uplink) signal, where the uplink signal is used to detect whether an active stylus 3 performs an operation on the touch display 2. For example, the uplink signal is used to detect whether the active stylus 3 performs an operation like touch or writing on the touch display 2.

According to the foregoing description, when a display refresh frequency is 60 Hz and a touch detection frequency is 120 Hz, eight touch detection phases T22 need to be inserted into one frame of display refresh.

Refer to FIG. 10. The touch display 2 transmits the uplink signal in the first long horizontal blanking phase LH1 and does not perform touch detection. Therefore, the plurality of long horizontal blanking phases LHs include the first long horizontal blanking phase LH1 to a ninth long horizontal blanking phase LH9, and the touch display 2 performs touch detection in the second long horizontal blanking phase LH2 to the ninth long horizontal blanking phase LH9.

In view of this, the control method of the touch display 2 further includes: reducing duration of a frame blanking interval T1 to increase duration of an effective operation interval T2, so that the first long horizontal blanking phase LH1 may be increased for the effective operation interval T2.

For example, according to a protocol for the active stylus 3 and the touch display 2, duration of the first long horizontal blanking phase LH1 is the same as a time width a of the uplink signal. Therefore, the duration of the frame blanking interval T1 may be reduced by a, to provide a time width for increasing the first long horizontal blanking phase LH1.

S20: In the second long horizontal blanking phase LH2 to the m$^{th}$ long horizontal blanking phase LH(m), the touch display 2 receives a downlink (downlink) signal from the active stylus 3, to perform active stylus 3 detection.

According to the control method provided in the foregoing embodiment of this application, the touch display 2 transmits the uplink signal in the first long horizontal blanking phase LH1. In a subsequent long horizontal blanking phase LH, the touch display 2 receives the downlink signal from the active stylus 3, to perform active stylus 3 detection.

Compared with the related technology in which the touch display 2 is controlled to transmit the uplink signal in the frame blanking interval T1, in the control method provided in the foregoing embodiment of this application, a time at which the touch display 2 transmits the uplink signal is moved from the frame blanking interval T1 to the long horizontal blanking phase LH. In this way, when the location of the long horizontal blanking phase LH changes, a location of the downlink signal changes, and a location of the uplink signal also needs to be changed according to the protocol for the active stylus 3 and the touch display 2. Because the touch display 2 does not transmit the uplink signal in the frame blanking interval T1, a time width of the frame blanking interval T1 does not need to be increased when the location of the uplink signal is changed. This avoids compressing a time width of the effective operation interval T2, avoids compressing a time width of a display refresh phase T21 and a time width of the touch detection phase T22, and helps improve performance of display refresh, touching detection, and active stylus 3 detection of the touch display 2.

In some embodiments, as shown in FIG. 10, in at least two frame periods T, two corresponding long horizontal blanking phases LHs are respectively located between row scanning time periods of two different adjacent rows of subpixels. In other words, locations of the two corresponding long horizontal blanking phases LHs in different frame periods T are different.

For example, in an i$^{th}$ frame period and a j$^{th}$ frame period (i≠j), a location of an uplink1 signal is different from a location of an uplink2 signal, and a location of a downlink1 signal is different from a location of a downlink2 signal, that is, locations of LH1 to LH(m) change. The i$^{th}$ frame period and the j$^{th}$ frame period may be two adjacent frame periods T, or may be two non-adjacent frame periods T.

"Two corresponding long horizontal blanking phases LHs" are two long horizontal blanking phases LHs that are in a same order in two different frame periods. For example, LH1 in the i$^{th}$ frame period corresponds to LH1 in the j$^{th}$ frame period, LH2 in the i$^{th}$ frame period corresponds to LH2 in the j$^{th}$ frame period, . . . , and LH(m) in the i$^{th}$ frame period corresponds to LH(m) in the j$^{th}$ frame period.

It may be understood that, in at least two frame periods T, two corresponding long horizontal blanking phases LHs are respectively located between row scanning time periods of two different adjacent rows of subpixels. A location of the long horizontal blanking phase LH in the different frame periods T is changed, so that a gate scanning signal stays in different shift registers for approximately the same time. In this way, speeds of aging and driving force decrease of different shift registers are approximately the same, a phenomenon of displaying a "bright line" or a "dark line" by each row of subpixels can be improved, and quality of a display picture can be improved.

In some embodiments, in two adjacent frame periods T, two corresponding long horizontal blanking phases LHs are respectively located between row scanning time periods of two different adjacent rows of subpixels.

It may be understood that, a location of the long horizontal blanking phase LH in two adjacent frame periods T is changed, so that duration in which the gate scanning signal stays in a same shift register can be further shortened. This helps reduce speeds of aging and driving force decrease of the shift register, improve a phenomenon of displaying a "bright line" or a "dark line" by the row of subpixels, and improve quality of a display picture.

In some embodiments, as shown in FIG. 10, in different frame periods T, duration of intervals between the plurality of long horizontal blanking phases LHs remains unchanged.

According to the foregoing description and the protocol for the active stylus 3 and the touch display 2, both duration of an interval between the uplink signal and a first downlink signal and duration of an interval between two adjacent downlink signals have a fixed value (b). According to the protocol, in different frame periods T, locations of the plurality of long horizontal blanking phases LHs are synchronously moved, so that the duration (which is always b) of the intervals between the plurality of long horizontal blanking phases LHs remains unchanged, so as to ensure accuracy of active stylus 3 detection.

In some embodiments, as shown in FIG. 10, in each frame period T, the plurality of long horizontal blanking phases LHs include at least three long horizontal blanking phases LHs, and any two adjacent long horizontal blanking phases LHs have equal duration of interval, so that the plurality of long horizontal blanking phases LHs are evenly distributed between row scanning time periods of a plurality of rows of subpixels.

In view of this, the location of the long horizontal blanking phase LH in different frame periods T is changed, so that the gate scanning signal stays in shift registers at all levels for approximately the same time. In this way, speeds of aging and driving force decrease of the shift registers at all levels are approximately the same, a phenomenon of displaying a "bright line" or a "dark line" by each row of subpixels can be improved, and quality of a display picture can be improved.

For example, any two adjacent long horizontal blanking phases LHs have equal duration of interval, and the duration of the interval is b, to meet the protocol for the active stylus 3 and the touch display 2.

In some embodiments, as shown in FIG. 10, according to the protocol for the active stylus 3 and the touch display 2, the time width of the uplink signal is a, and a time width of the downlink signal is c.

The touch display 2 transmits the uplink signal in the first long horizontal blanking phase LH1, and performs active stylus 3 detection based on the downlink signal in the second long horizontal blanking phase LH2 to the $m^{th}$ long horizontal blanking phase LH(m). Therefore, the duration of the first long horizontal blanking phase LH1 is a, and the second long horizontal blanking phase LH2 to the $m^{th}$ long horizontal blanking phase LH(m) have equal duration and the duration is c.

When a≠c, the duration of the first long horizontal blanking phase LH1 is not equal to duration of any one long horizontal blanking phase LH of the second long horizontal blanking phase LH2 to the $m^{th}$ long horizontal blanking phase LH(m).

When a=c, the first long horizontal blanking phase LH1 to the $m^{th}$ long horizontal blanking phase LH(m) have equal duration.

Figure 12:
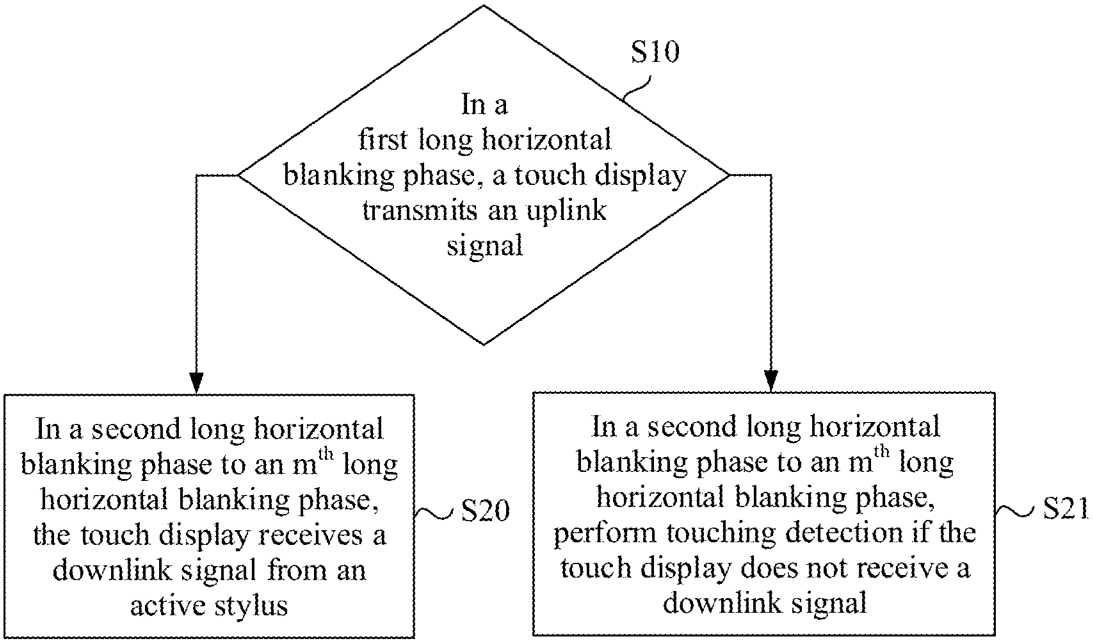
FIG. 12 to FIG. 14 are a plurality of flowcharts of a control method of a touch display according to some embodiments.
Figure 13:
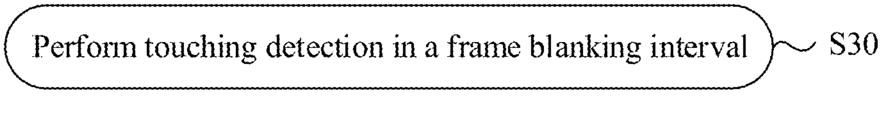
Figure 14:
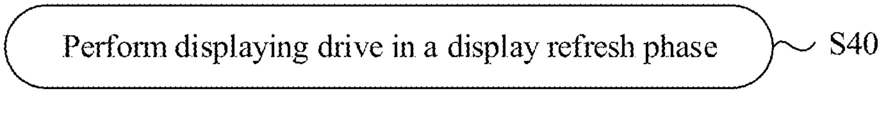

FIG. 12 to FIG. 14 are a plurality of flowcharts of a control method of a touch display according to some embodiments.

Refer to FIG. 12. The control method of the touch display 2 includes the following S21.

S21: Perform touching detection in a second long horizontal blanking phase LH2 to an $m^{th}$ long horizontal blanking phase LH(m) if the touch display 2 does not receive the downlink signal.

It may be understood that, in the second long horizontal blanking phase LH2 to the $m^{th}$ long horizontal blanking phase LH(m), if the touch display 2 does not receive the downlink signal, it indicates that an active stylus 3 is not close to the touch display 2, and the active stylus 3 does not perform an operation on the touch display 2. In view of this, a plurality of touch electrodes 26 may be used to perform touching detection.

In some embodiments, as shown in FIG. 13, the control method of the touch display 2 includes the following S30.

S30: Perform touching detection in a frame blanking interval T1.

It may be understood that, in the frame blanking interval T1, the touch display 2 does not perform display refresh, and the touch electrode 26 may be used to perform touching detection, to detect a touch operation performed by a user on the touch display 2.

In some embodiments, as shown in FIG. 14, the control method of the touch display 2 includes the following S40.

S40: Perform displaying drive in a display refresh phase T21.

It may be understood that, in the display refresh phase T21, the plurality of touch electrodes 26 are multiplexed as common electrodes, and a pixel electrode 232 and the touch electrode 26 form an electric field, to drive liquid crystal molecules in a liquid crystal layer 25 to rotate, so as to implement displaying drive of the touch display 2.

Figure 15:
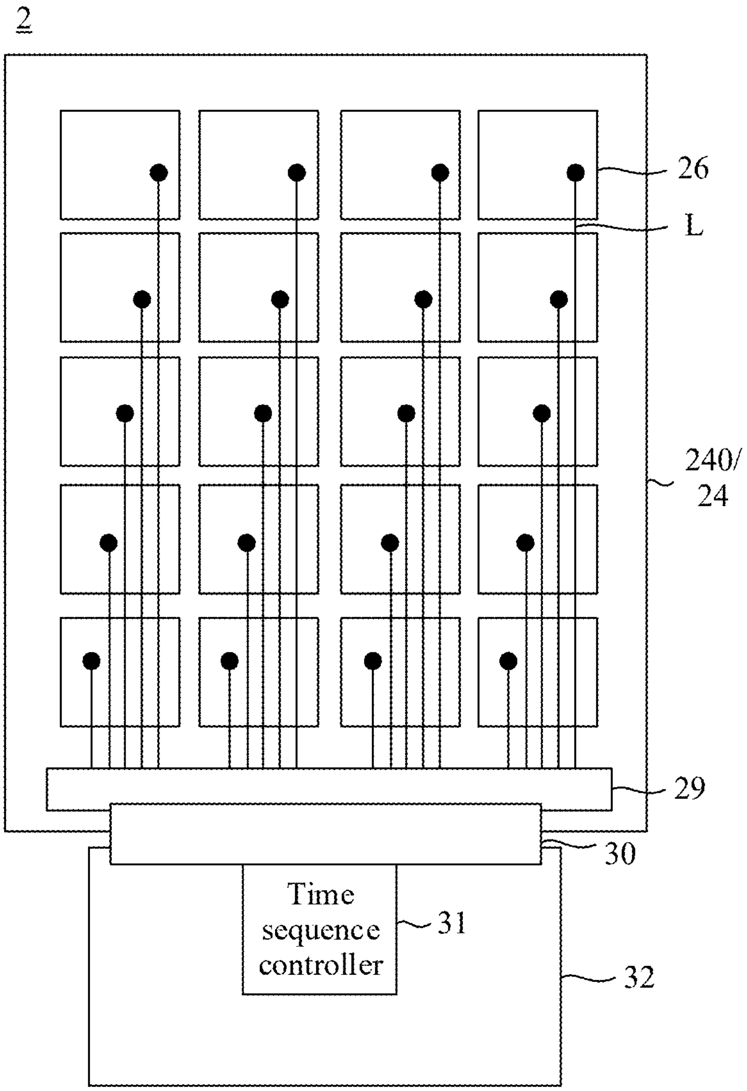
FIG. 15 is a diagram of a structure of a touch display according to some embodiments.

Some embodiments of this application further provide a touch display. FIG. 15 is a diagram of a structure of a touch display according to some embodiments.

Refer to FIG. 15. The touch display 2 is configured to transmit an uplink signal in a first long horizontal blanking phase, and receive a downlink signal from an active stylus in a second long horizontal blanking phase to an $m^{th}$ long horizontal blanking phase.

According to the touch display provided in the foregoing embodiment of this application, the touch display 2 transmits the uplink signal in the first long horizontal blanking phase LH1. In a subsequent long horizontal blanking phase LH, the touch display 2 receives the downlink signal from the active stylus 3, to perform active stylus 3 detection.

A location of the long horizontal blanking phase changes in different frame periods. In this case, a time at which the touch display 2 transmits the uplink signal is moved from a frame blanking interval T1 to the long horizontal blanking phase LH. In this way, when the location of the long horizontal blanking phase LH changes, a location of the downlink signal changes, and a location of the uplink signal also needs to be changed according to a protocol for the active stylus 3 and the touch display 2. Because the touch display 2 does not transmit the uplink signal in the frame blanking interval T1, a time width of the frame blanking interval T1 does not need to be increased when the location of the uplink signal is changed. This avoids compressing a time width of an effective operation interval T2, avoids compressing a time width of a display refresh phase T21 and a time width of a touch detection phase T22, and helps improve performance of display refresh, touching detection, and active stylus 3 detection of the touch display 2.

In some embodiments, as shown in FIG. 15, the touch display 2 includes a time sequence controller 31, a touch drive circuit 29, and a plurality of touch electrodes 26 disposed inside the touch display 2.

For example, the touch display 2 further includes a printed circuit board (Printed Circuit Board, PCB for short) 32, and the time sequence controller 31 may be disposed on the printed circuit board 32.

Still refer to FIG. 15. The time sequence controller 31 is electrically connected to the plurality of touch electrodes 26 via the touch drive circuit 29, and the time sequence controller 31 is configured to send a first control signal to the touch drive circuit 29 in the first long horizontal blanking phase LH1. The touch drive circuit 29 is configured to drive, in response to the first control signal, the plurality of touch electrodes 26 to transmit the uplink signal.

The time sequence controller 31 is further configured to send a second control signal to the touch drive circuit 29 in the second long horizontal blanking phase LH2 to the $m^{th}$ long horizontal blanking phase LH(m). The touch drive circuit 29 is further configured to perform active stylus 3 detection in response to the second control signal if the plurality of touch electrodes 26 receive the downlink signal from the active stylus, so as to flexibly control the active stylus 3 and the touch display 2.

For example, the time sequence controller 31 and the touch drive circuit 29 may be connected via a flexible printed circuit (Flexible Printed Circuit, FPC for short) 30.

In the foregoing embodiment, the time sequence controller 31 controls the touch drive circuit 29, and in the first long horizontal blanking phase LH1, the touch drive circuit 29 transmits a drive signal to the touch electrode 26, to drive the plurality of touch electrodes 26 to transmit the uplink signal.

In addition, in the second long horizontal blanking phase LH2 to the $m^{th}$ long horizontal blanking phase LH(m), when the active stylus 3 is close to the touch electrode 26, the touch electrode 26 senses the active stylus 3, to receive the downlink signal from the active stylus 3. The time sequence controller 31 controls the touch drive circuit 29, and the touch drive circuit 29 may perform active stylus 3 detection based on the downlink signal on the touch electrode 26.

In some embodiments, as shown in FIG. 15, the time sequence controller 31 is further configured to send a third control signal to the touch drive circuit 29 in the second long horizontal blanking phase LH2 to the $m^{th}$ long horizontal blanking phase LH(m). The touch drive circuit 29 is further configured to drive, in response to the third control signal if the plurality of touch electrodes 26 do not receive the downlink signal from the active stylus 3, the plurality of touch electrodes 26 to perform touching detection.

It may be understood that, in the second long horizontal blanking phase LH2 to the $m^{th}$ long horizontal blanking phase LH(m), if the plurality of touch electrodes 26 do not receive the downlink signal, it indicates that the active stylus 3 is not close to the touch display 2, and the active stylus 3 does not perform an operation on the touch display 2.

In view of this, when a user touches the touch display 2, the touch electrode 26 generates a sensing signal. The time sequence controller 31 controls the touch drive circuit 29, and the touch drive circuit 29 may perform touching detection based on the sensing signal.

In some embodiments, as shown in FIG. 15, the time sequence controller 31 is further configured to send a fourth control signal to the touch drive circuit 29 in the frame blanking interval T1. The touch drive circuit 29 is further configured to drive, in response to the fourth control signal, the plurality of touch electrodes 26 to perform touching detection.

It may be understood that, in the frame blanking interval T1, the touch display 2 does not perform display refresh. In view of this, when the user touches the touch display 2, the touch electrode 26 generates a sensing signal. The time sequence controller 31 controls the touch drive circuit 29, and the touch drive circuit 29 may perform touching detection based on the sensing signal.

In some embodiments, as shown in FIG. 15, the time sequence controller 31 is further configured to send a fifth control signal to the touch drive circuit 29 in the display refresh phase T21. The touch drive circuit 29 is further configured to enable, in response to the fifth control signal, the plurality of touch electrodes 26 to perform displaying drive.

It may be understood that, in the display refresh phase T21, the plurality of touch electrodes 26 are multiplexed as common electrodes, and the time sequence controller 31 controls the touch drive circuit 29, to transmit a common voltage signal to the plurality of touch electrodes 26. In addition, a pixel electrode 232 receives a pixel voltage signal from a pixel driving circuit 231, and the pixel electrode 232 and the touch electrode 26 form an electric field, to drive liquid crystal molecules in the liquid crystal layer 25 to rotate, so as to implement displaying drive of the touch display 2.

According to a touch display device 1 provided in some embodiments of this application, the touch display 2 is configured to transmit the uplink signal in the first long horizontal blanking phase LH1. The active stylus 3 is configured to transmit at least one downlink signal in response to the uplink signal. The touch display 2 is further configured to receive the at least one downlink signal in at least one long horizontal blanking phase LH of the second long horizontal blanking phase LH2 to the $m^{th}$ long horizontal blanking phase LH(m), so as to detect the active stylus 3.

According to the touch display device 1 provided in the foregoing embodiment of this application, the touch display 2 may transmit the uplink signal in the first long horizontal blanking phase LH1. According to the protocol for the active stylus 3 and the touch display 2, the active stylus 3 transmits at least one downlink signal in response to the uplink signal in at least one long horizontal blanking phase LH of the second long horizontal blanking phase LH2 to the $m^{th}$ long horizontal blanking phase LH(m). The touch display 2 may receive the downlink signal in a corresponding long horizontal blanking phase LH, to detect the active stylus 3.

A location of the long horizontal blanking phase LH changes in different frame periods T. In this case, the touch display 2 transmits the uplink signal in the first long horizontal blanking phase LH1, and does not transmit an uplink signal in the frame blanking interval T1. The time width of the frame blanking interval T1 does not need to be increased when the location of the uplink signal changes. This avoids compressing the time width of the effective operation interval T2, avoids compressing the time width of the display refresh phase T21 and the time width of the touch detection phase T22, and helps improve performance of display refresh, touching detection, and active stylus 3 detection of the touch display 2.

Figure 16:
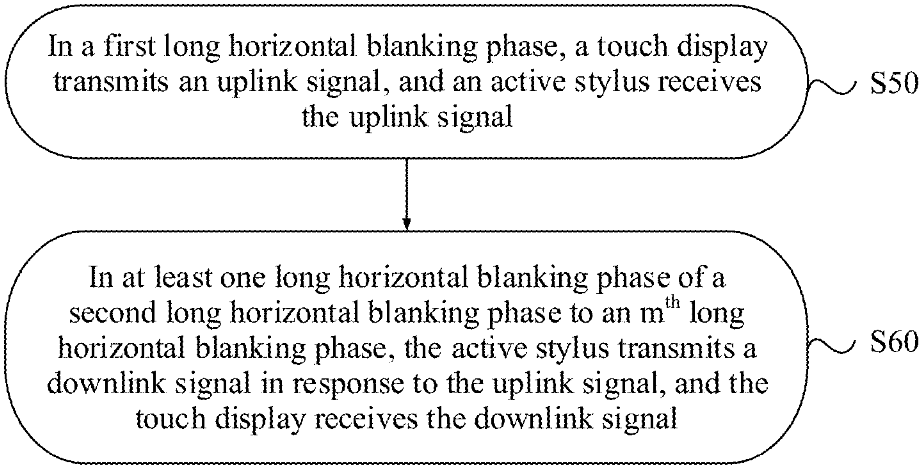
FIG. 16 is a flowchart of a control method of a touch display device according to some embodiments.

Some embodiments of this application further provide a control method of a touch display device. FIG. 16 is a flowchart of a control method of a touch display device according to some embodiments.

Refer to FIG. 16. The control method of the touch display device 1 includes the following S50 and S60.

S50: In a first long horizontal blanking phase LH1, a touch display 2 transmits an uplink signal, and an active stylus 3 receives the uplink signal.

For example, in the first long horizontal blanking phase LH1, the active stylus 3 is close to the touch display 2, to receive the uplink signal transmitted by the touch display 2.

S60: In at least one long horizontal blanking phase LH of a second long horizontal blanking phase LH2 to an $m^{th}$ long horizontal blanking phase LH(m), the active stylus 3 transmits a downlink signal in response to the uplink signal. The touch display 2 receives the downlink signal to detect the active stylus 3.

According to the control method provided in the foregoing embodiment of this application, the touch display 2 transmits the uplink signal in the first long horizontal blanking phase LH1, and the active stylus 3 receives the uplink signal. According to a protocol for the active stylus 3 and the touch display 2, in at least one subsequent long horizontal blanking phase LH, the active stylus 3 transmits the downlink signal in response to the uplink signal, and the touch display 2 receives the downlink signal, so as to detect the active stylus 3.

A location of the long horizontal blanking phase LH changes in different frame periods T. In this case, the touch display 2 transmits the uplink signal in the first long horizontal blanking phase LH1, and does not transmit an uplink signal in the frame blanking interval T1. The time width of the frame blanking interval T1 does not need to be increased when the location of the uplink signal changes. This avoids compressing the time width of the effective operation interval T2, avoids compressing the time width of the display refresh phase T21 and the time width of the touch detection phase T22, and helps improve performance of display refresh, touching detection, and active stylus 3 detection of the touch display 2.

The foregoing descriptions are merely specific implementations of this disclosure, but are not intended to limit the protection scope of this disclosure. Any variation or replacement thought by a person skilled in the art within the technical scope disclosed in this disclosure shall fall within the protection scope of this disclosure. Therefore, the protection scope of this disclosure shall be subject to the protection scope of the claims.

The invention claimed is:

1. A control method of a touch display, wherein displaying of the touch display comprises a plurality of frame periods, each frame period comprises a frame blanking interval and an effective operation interval, the effective operation interval comprises a plurality of display refresh phases and a plurality of long horizontal blanking phases that are alternately arranged, the plurality of long horizontal blanking phases comprise a first long horizontal blanking phase to an $m^{th}$ long horizontal blanking phase, and m>2, wherein the plurality of display refresh phases comprise row scanning time periods of a plurality of rows of subpixels of the touch display; and in at least two frame periods, two corresponding long horizontal blanking phases are respectively located between row scanning time periods of two different adjacent rows of subpixels; and the control method comprises: transmitting an uplink signal in the first long horizontal blanking phase; and receiving a downlink signal from an active stylus in at least one long horizontal blanking phase of a second long horizontal blanking phase to an $m^{th}$ long horizontal blanking phase.

2. The control method according to claim 1, wherein in two adjacent frame periods, two corresponding long horizontal blanking phases are respectively located between row scanning time periods of two different adjacent rows of subpixels.

3. The control method according to claim 1, wherein duration of intervals between the plurality of long horizontal blanking phases remains unchanged in different frame periods.

4. The control method according to claim 1, wherein in the frame period, the plurality of long horizontal blanking phases comprise at least three long horizontal blanking phases, and any two adjacent long horizontal blanking phases have equal duration of interval.

5. The control method according to claim 1, wherein:

the second long horizontal blanking phase to the $m^{th}$ long horizontal blanking phase have equal duration, and duration of the first long horizontal blanking phase is not equal to duration of any one long horizontal blanking phase of the second long horizontal blanking phase to the $m^{th}$ long horizontal blanking phase; or the first long horizontal blanking phase to the $m^{th}$ long horizontal blanking phase have equal duration.

6. The control method according to claim 1, wherein duration of the uplink signal is equal to the duration of the first long horizontal blanking phase.

7. The control method according to claim 1, wherein the control method further comprises:

performing, in the second long horizontal blanking phase to the $m^{th}$ long horizontal blanking phase, touching detection if the touch display does not receive the downlink signal.

8. The control method according to claim 1, wherein the control method further comprises:

performing touching detection in the frame blanking interval.

9. The control method according to claim 1, wherein the control method further comprises:

performing displaying drive in the display refresh phase.

10. A touch display, wherein displaying of the touch display comprises a plurality of frame periods, each frame period comprises a frame blanking interval and an effective operation interval, the effective operation interval comprises a plurality of display refresh phases and a plurality of long horizontal blanking phases that are alternately arranged, the plurality of long horizontal blanking phases comprise a first long horizontal blanking phase to an $m^{th}$ long horizontal blanking phase, and m>2, wherein the plurality of display refresh phases comprise row scanning time periods of a plurality of rows of subpixels of the touch display; and in at least two frame periods, two corresponding long horizontal blanking phases are respectively located between row scanning time periods of two different adjacent rows of subpixels; and the touch display is configured to: transmit an uplink signal in the first long horizontal blanking phase; and receive a downlink signal from an active stylus in at least one long horizontal blanking phase of a second long horizontal blanking phase to an $m^{th}$ long horizontal blanking phase.

11. The touch display according to claim 10, wherein the touch display comprises a time sequence controller, a touch drive circuit, and a plurality of touch electrodes disposed inside the touch display, and the time sequence controller is electrically connected to the plurality of touch electrodes through the touch drive circuit;

the time sequence controller is configured to send a first control signal to the touch drive circuit in the first long horizontal blanking phase;

the touch drive circuit is configured to drive the plurality of touch electrodes to transmit the uplink signal in response to the first control signal;

the time sequence controller is further configured to send a second control signal to the touch drive circuit in the second long horizontal blanking phase to the $m^{th}$ long horizontal blanking phase; and the touch drive circuit is further configured to perform active stylus detection in response to the second control signal if the plurality of touch electrodes receive the downlink signal from the active stylus.

12. The touch display according to claim 11, wherein:

the time sequence controller is further configured to send a third control signal to the touch drive circuit in the second long horizontal blanking phase to the $m^{th}$ long horizontal blanking phase; and the touch drive circuit is further configured to drive, in response to the third control signal and if the plurality of touch electrodes do not receive the downlink signal from the active stylus, the plurality of touch electrodes to perform touching detection.

13. The touch display according to claim 11, wherein:

the time sequence controller is further configured to send a fourth control signal to the touch drive circuit in the frame blanking interval; and the touch drive circuit is further configured to drive, in response to the fourth control signal, the plurality of touch electrodes to perform touching detection.

14. The touch display according to claim 11, wherein:

the time sequence controller is further configured to send a fifth control signal to the touch drive circuit in the display refresh phase; and the touch drive circuit is further configured to drive, in response to the fifth control signal, the plurality of touch electrodes to perform displaying drive.

15. The touch display according to claim 11, wherein, in the display refresh phase, the plurality of touch electrodes are multiplexed as common electrodes, and the time sequence controller controls the touch drive circuit, to transmit a common voltage signal to the plurality of touch electrodes.

16. The touch display according to claim 15, wherein the downlink signal is received from the active stylus in response to a touch operation or a write operation on the touch display.

17. A touch display device, comprising an active stylus and a touch display, wherein: the touch display is configured to transmit an uplink signal in a first long horizontal blanking phase; the active stylus is configured to transmit at least one downlink signal in response to the uplink signal; and the touch display is further configured to receive the at least one downlink signal in at least one long horizontal blanking phase of a second long horizontal blanking phase to an $m^{th}$ long horizontal blanking phase, and wherein displaying of the touch display comprises a plurality of frame periods, and in at least two frame periods, two corresponding long horizontal blanking phases are respectively located between row scanning time periods of two different adjacent rows of subpixels of the touch display; wherein a plurality of display refresh phases comprise row scanning time periods of a plurality of rows of subpixels of the touch display.

18. A control method of a touch display device, wherein the touch display device comprises an active stylus and a touch display; and the control method comprises: transmitting, by the touch display in a first long horizontal blanking phase, an uplink signal; receiving, by the active stylus, the uplink signal; and transmitting, by the active stylus, a downlink signal in response to the uplink signal in at least one long horizontal blanking phase of a second long horizontal blanking phase to an $m^{th}$ long horizontal blanking phase, and $m>2$, wherein a plurality of display refresh phases comprise row scanning time periods of a plurality of rows of subpixels of the touch display; and in at least two frame periods, two corresponding long horizontal blanking phases are respectively located between row scanning time periods of two different adjacent rows of subpixels; and receiving, by the touch display, the downlink signal from the active stylus in at least one long horizontal blanking phase of a second long horizontal blanking phase to an $m^{th}$ long horizontal blanking phase.

19. The control method of claim 18, wherein:

the second long horizontal blanking phase to the $m^{th}$ long horizontal blanking phase have equal duration, and duration of the first long horizontal blanking phase is not equal to duration of any one long horizontal blanking phase of the second long horizontal blanking phase to the $m^{th}$ long horizontal blanking phase; or the first long horizontal blanking phase to the $m^{th}$ long horizontal blanking phase have equal duration.

* * * * *